United States Patent
Simon et al.

(10) Patent No.: US 9,387,809 B2
(45) Date of Patent: Jul. 12, 2016

(54) VEHICLE CONSOLE BIN UTILIZING A CONSTANT FORCE SPRING

(71) Applicant: Ford Global Technologies, LLC, Dearborn, MI (US)

(72) Inventors: Scott Simon, Dexter, MI (US); Christopher Emery Fesenmyer, Flat Rock, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/639,592

(22) Filed: Mar. 5, 2015

(65) Prior Publication Data
US 2016/0167588 A1    Jun. 16, 2016

Related U.S. Application Data

(60) Provisional application No. 62/090,545, filed on Dec. 11, 2014.

(51) Int. Cl.
*B60R 7/06*    (2006.01)

(52) U.S. Cl.
CPC ........................................ *B60R 7/06* (2013.01)

(58) Field of Classification Search
CPC .............. B60R 7/04; B60R 2011/0007; B60R 2011/0028; B60R 2011/0005; B60R 7/06; B60N 2/4686; B60N 2/4646; B60Q 3/022; A01C 15/16
USPC .................... 296/37.12, 24.34, 37.8; 224/92.6
See application file for complete search history.

(56) References Cited

U.S. PATENT DOCUMENTS

| | | | | |
|---|---|---|---|---|
| 4,733,900 A | * | 3/1988 | Fluharty | B60N 3/002 108/134 |
| 4,925,072 A | * | 5/1990 | Masler | B60N 3/083 224/280 |
| 5,020,845 A | * | 6/1991 | Falcoff | B60R 7/04 224/311 |
| 5,050,922 A | * | 9/1991 | Falcoff | B60R 7/04 224/311 |
| 5,524,050 A | * | 6/1996 | Boerema | B60R 11/0241 379/441 |
| 5,887,929 A | * | 3/1999 | Miller | B60R 7/04 296/37.7 |
| 6,003,925 A | * | 12/1999 | Litke | B60R 7/04 16/319 |
| 6,062,623 A | * | 5/2000 | Lemmen | B60R 7/04 224/282 |

(Continued)

FOREIGN PATENT DOCUMENTS

| | | |
|---|---|---|
| CN | 203111053 | 8/2013 |
| DE | 10055183 | 5/2002 |
| JP | 2012111365 | 6/2012 |

*Primary Examiner* — Kiran B Patel
(74) *Attorney, Agent, or Firm* — Vichit Chea; Price Heneveld LLP (57) ABSTRACT

A console assembly includes an outer frame having a bin aperture defined therein, wherein an arcuate back wall extends from the bin aperture to within the outer frame. A rotatable bin is disposed in the bin aperture and includes an interior volume accessible through a rim. The rotatable bin is rotationally operable within the bin aperture between a closed position and an open position, wherein at least a portion of the rotatable bin is rotated through the bin aperture and the interior volume of the rotatable bin is accessible from above. A biasing mechanism extends from the arcuate back wall to the rear wall of the rotatable bin. The biasing mechanism includes a constant force spring that biases the rotatable bin toward the open position. A latch/release mechanism retains the rotatable bin in the closed position against a biasing force of the biasing mechanism.

20 Claims, 8 Drawing Sheets

(56) References Cited

U.S. PATENT DOCUMENTS

| | | | | |
|---|---|---|---|---|
| 6,135,528 | A * | 10/2000 | Sobieski | B60R 7/04 224/311 |
| 6,231,099 | B1 * | 5/2001 | Greenwald | B60R 7/06 220/531 |
| 6,234,570 | B1 * | 5/2001 | Quinno | B60J 3/0204 296/214 |
| 6,669,258 | B1 | 12/2003 | Kato | |
| 6,692,053 | B1 * | 2/2004 | Smith | B60N 3/102 224/282 |
| 6,932,402 | B2 | 8/2005 | Niwa et al. | |
| 7,234,746 | B2 | 6/2007 | Sakakibara et al. | |
| 7,380,852 | B2 * | 6/2008 | Vander Kuyl | B60R 7/04 296/24.34 |
| 8,074,832 | B2 | 12/2011 | Fujiwara et al. | |
| 9,073,494 | B1 * | 7/2015 | Clark | B60R 7/082 |
| 2004/0036304 | A1 * | 2/2004 | Thompson | B60N 3/023 296/1.02 |
| 2005/0218681 | A1 * | 10/2005 | DePue | B60R 7/06 296/37.12 |
| 2006/0208506 | A1 * | 9/2006 | Kern | B60R 7/04 292/304 |
| 2007/0013202 | A1 * | 1/2007 | Tompson | B60R 7/04 296/37.1 |
| 2007/0133217 | A1 * | 6/2007 | Tiesler | B60Q 3/022 362/459 |
| 2008/0067827 | A1 * | 3/2008 | Tiesler | B60R 1/008 296/37.7 |
| 2010/0102609 | A1 * | 4/2010 | Confer | B60N 2/24 297/335 |
| 2011/0018286 | A1 * | 1/2011 | Mitchell, Jr. | B60R 7/06 292/173 |
| 2011/0175376 | A1 * | 7/2011 | Whitens | B60R 7/06 292/251.5 |
| 2012/0001447 | A1 * | 1/2012 | Simon | B60N 2/4686 296/24.34 |
| 2012/0230047 | A1 * | 9/2012 | Smith | B60Q 3/022 362/543 |
| 2013/0026778 | A1 * | 1/2013 | Biggs | B60R 7/04 296/37.8 |
| 2013/0076216 | A1 * | 3/2013 | Schmitz | B64D 11/003 312/308 |
| 2013/0134729 | A1 * | 5/2013 | Zimmerman | B60R 7/04 296/24.34 |
| 2013/0153447 | A1 | 6/2013 | Cinco | |
| 2013/0193706 | A1 * | 8/2013 | Minelli | B60R 7/082 296/37.8 |
| 2014/0153163 | A1 * | 6/2014 | Harding | B60R 11/02 361/679.01 |
| 2014/0265408 | A1 * | 9/2014 | Brinas | B60R 7/04 296/37.8 |
| 2014/0284155 | A1 * | 9/2014 | Zhang | E05F 3/14 188/292 |
| 2015/0115642 | A1 * | 4/2015 | Suzuki | B60R 7/04 296/37.8 |
| 2015/0197189 | A1 * | 7/2015 | Salter | B60Q 3/022 362/510 |
| 2015/0360616 | A1 * | 12/2015 | Shami | B60R 7/06 296/37.8 |

* cited by examiner

VEHICLE CONSOLE BIN UTILIZING A CONSTANT FORCE SPRING

CROSS-REFERENCE TO RELATED APPLICATION

This application claims priority to and the benefit under 35 U.S.C. §119(e) of U.S. Provisional Patent Application No. 62/090,545, filed on Dec. 11, 2014, entitled "VEHICLE CONSOLE BIN UTILIZING A CONSTANT FORCE SPRING," the entire disclosure of which is hereby incorporated herein by reference.

FIELD OF THE INVENTION

The present invention generally relates to console assemblies disposed within passenger compartments of vehicles, and more specifically, a console assembly including a rotatable bin that utilizes a constant force spring.

BACKGROUND OF THE INVENTION

Typical automobiles include center consoles that have rear facing portions that allow passengers of the rear portion of the passenger cabin to access various utility features disposed within the center console. Such utility features can include electrical receptacles, heating ventilation and air conditioning controls, accessory bins, and other various features.

SUMMARY OF THE INVENTION

According to one aspect of the present invention, a console assembly for a vehicle includes an outer frame having a bin aperture defined therein, wherein an arcuate back wall extends from proximate the top of the bin aperture to a position within an inner volume defined by the outer frame. A rotatable bin is disposed in the bin aperture and includes a plurality of sides, a back wall, a base and a front panel that define an interior volume of the rotatable bin accessible through an open top. The rotatable bin is rotationally operable within the bin aperture between a closed position, wherein the front panel of the rotatable bin is substantially flush with an outer surface of the outer frame proximate the bin aperture, and an open position wherein at least a portion of the rotatable bin is rotated through the bin aperture and the interior volume of the rotatable bin is accessible from above. A biasing mechanism is disposed within the inner volume of the outer frame and extends from the arcuate back wall to the back wall of the rotatable bin. The biasing mechanism is a constant force spring that biases the rotatable bin toward the open position. A latch/release mechanism retains the rotatable bin in the closed position and against a biasing force of the biasing mechanism.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
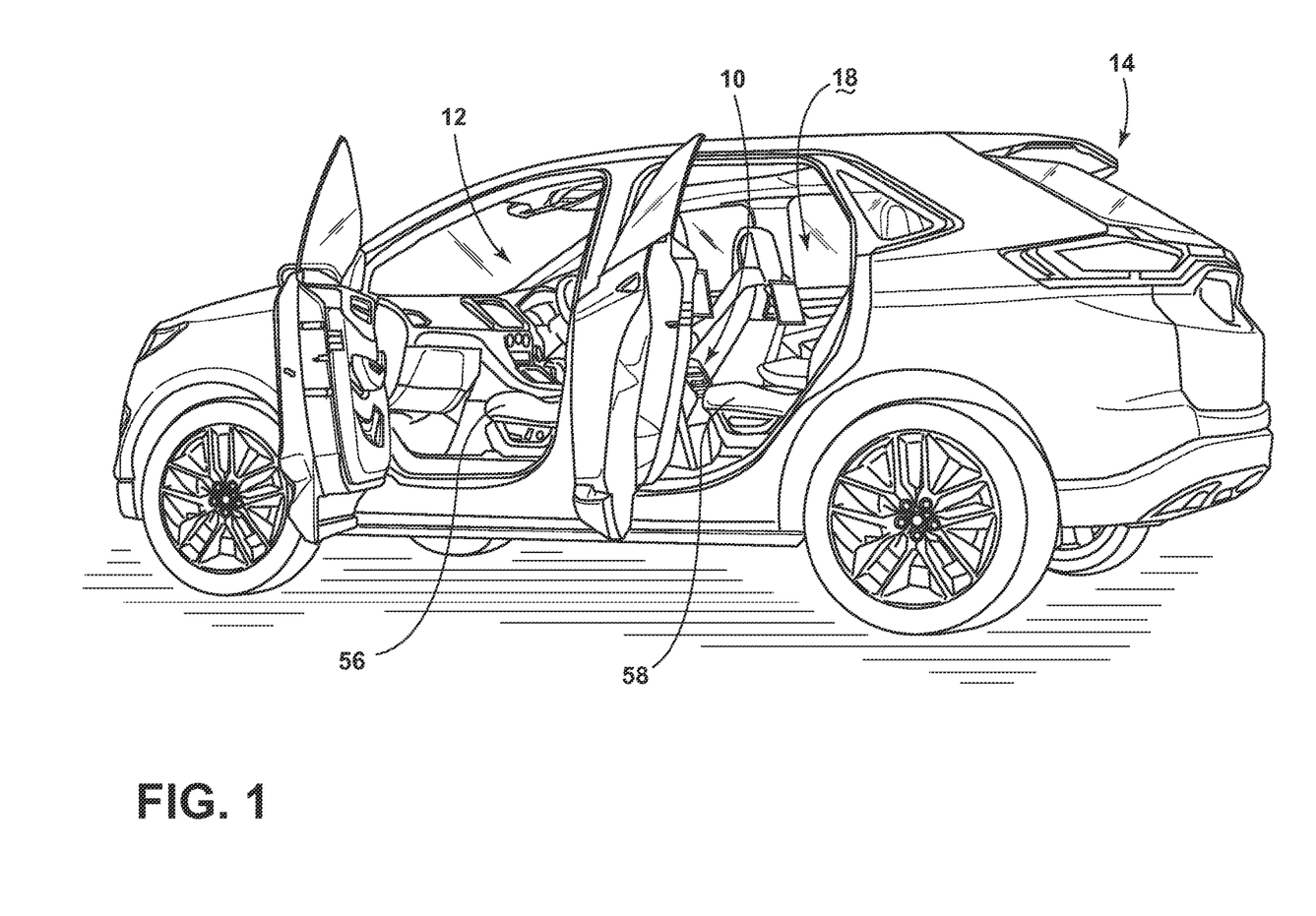
FIG. 1 is a side perspective view of a vehicle incorporating an embodiment of the center console.
Figure 2:
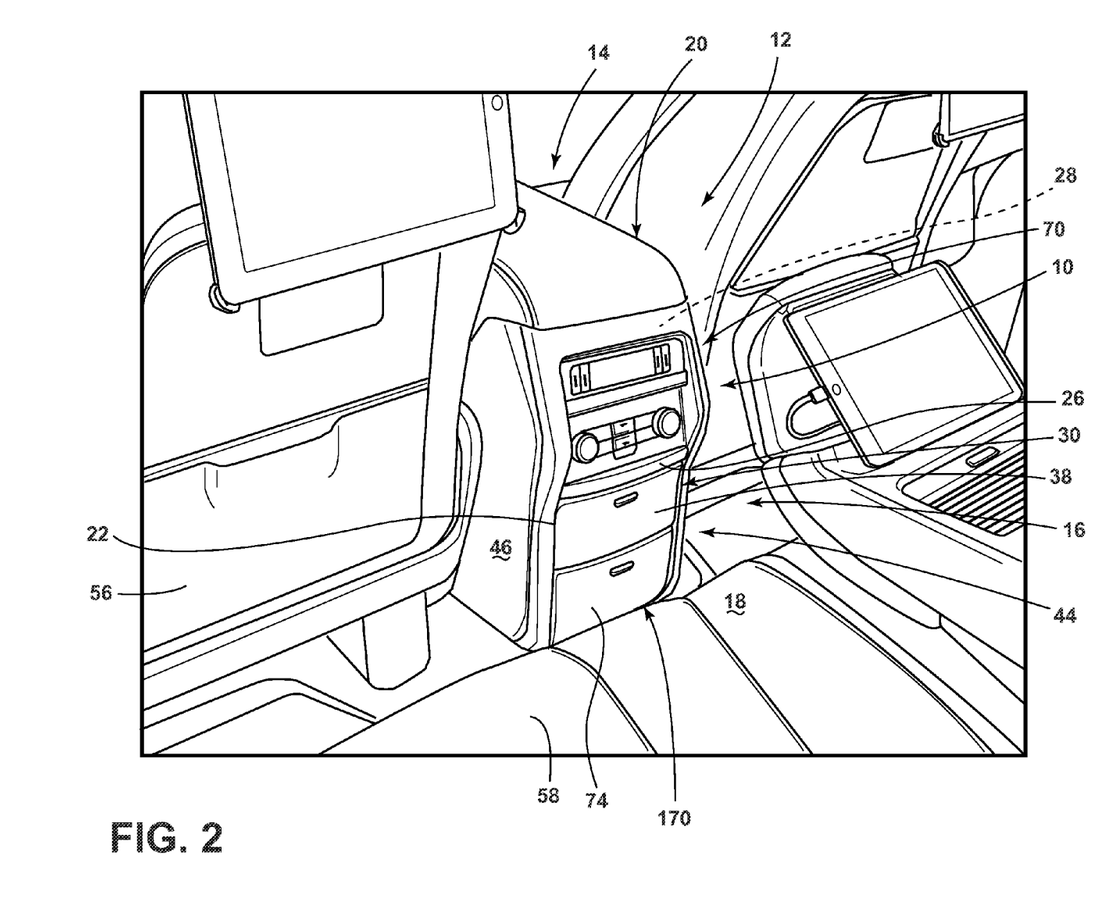
FIG. 2 is a rear perspective view of the center console of FIG. 1, as viewed by a passenger of the rear portion of the passenger compartment.
Figure 3:
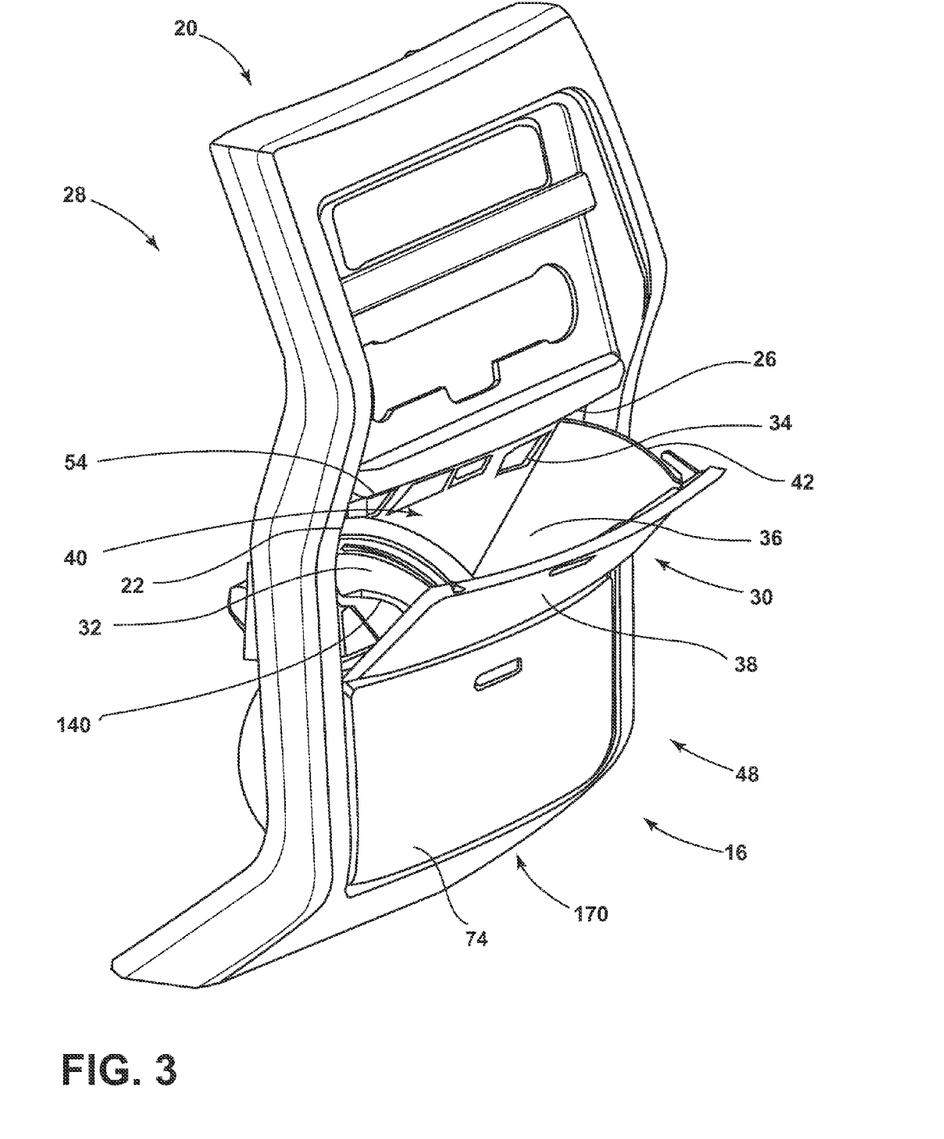
FIG. 3 is a top perspective view of a portion of the outer frame of an embodiment of the center console defining various bin apertures and a rotatable bin disposed in an open position.
Figure 4:
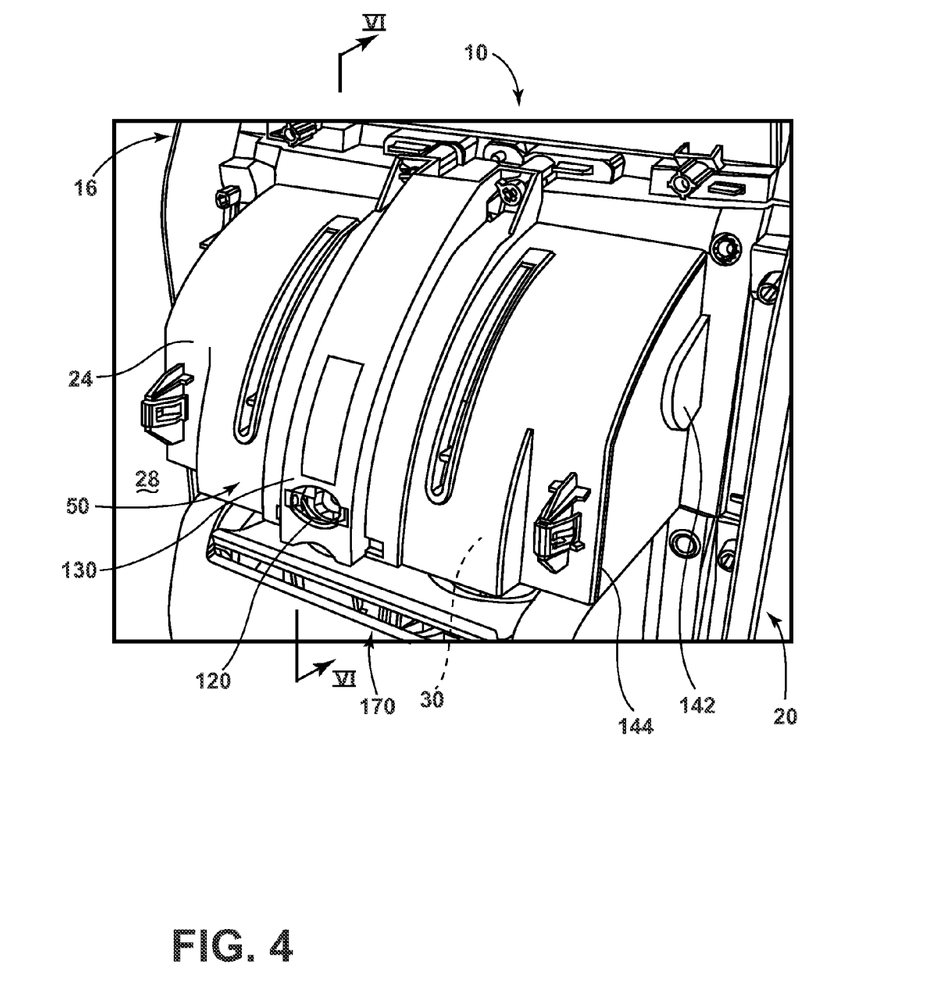
FIG. 4 is a rear perspective view of an inner volume of the outer frame of FIG. 3, viewing the arcuate back wall of the console assembly.
Figure 5:
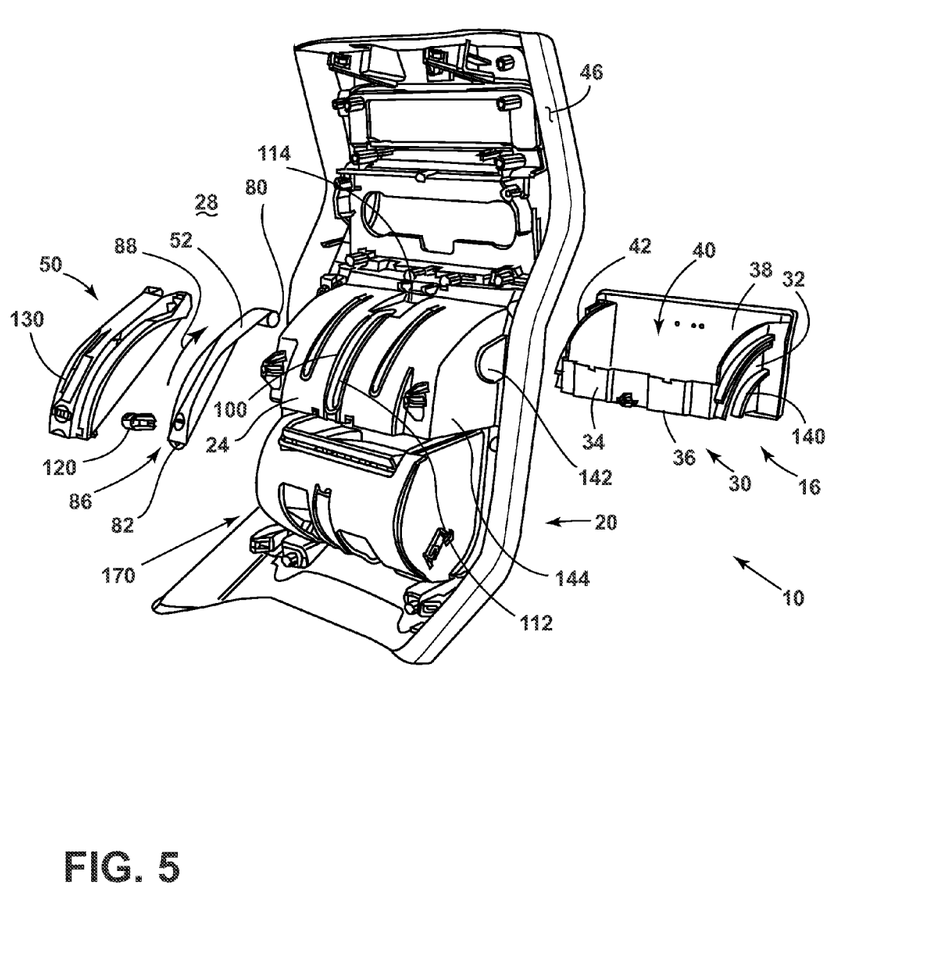
FIG. 5 is an exploded rear perspective view of the outer frame of the center console of FIG. 3.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a center console assembly disposed within the passenger cabin of a vehicle, where the console assembly 10 of the vehicle 14 includes a rear portion 16 that is accessible by passengers positioned in the rear area 18 of the passenger cabin 12 of the vehicle 14, according to one embodiment. The console assembly 10 for a vehicle 14 includes an outer frame 20 having a bin aperture 22 defined therein. An arcuate back wall 24 extends from proximate the top 26 of the bin aperture 22 to a position within an inner volume 28 defined by the outer frame 20. A rotatable bin 30 is disposed within the bin aperture 22 and includes a plurality of sides 32, a rear wall 34, a base 36 and a front panel 38 that cooperate to define an interior volume 40 of the rotatable bin 30. The interior volume 40 of the rotatable bin 30 is accessible through a rim 42 of the rotatable bin 30. The rotatable bin 30 is rotationally operable within the bin aperture 22 between a closed position 44 that is defined by the front panel 38 of the rotatable bin 30 being substantially flush with an exterior surface 46 of the outer frame 20 proximate the bin aperture 22. The rotatable bin 30 is rotationally operable from this closed position 44, to an open position 48 that is defined by at least a portion of the rotatable bin 30 being rotated through the bin aperture 22, such that the interior volume 40 of the rotatable bin 30 is accessible from above and outside of the outer frame 20 of the console assembly 10. A biasing mechanism 50 is disposed within the inner volume 28 of the outer frame 20 and extends from the arcuate back wall 24 to the rear wall 34 of the rotatable bin 30. The biasing mechanism 50 can include a constant force spring 52 that biases the rotatable bin 30 toward the open position 48 at a substantially constant rate of speed and/or a substantially constant rotational rate. A latch/release mechanism 54 is configured to retain the rotatable bin 30 in a closed position 44 and operates against a biasing force 88 of the biasing mechanism 50 to so retain the rotatable bin 30 in the closed position 44.

Figure 6:
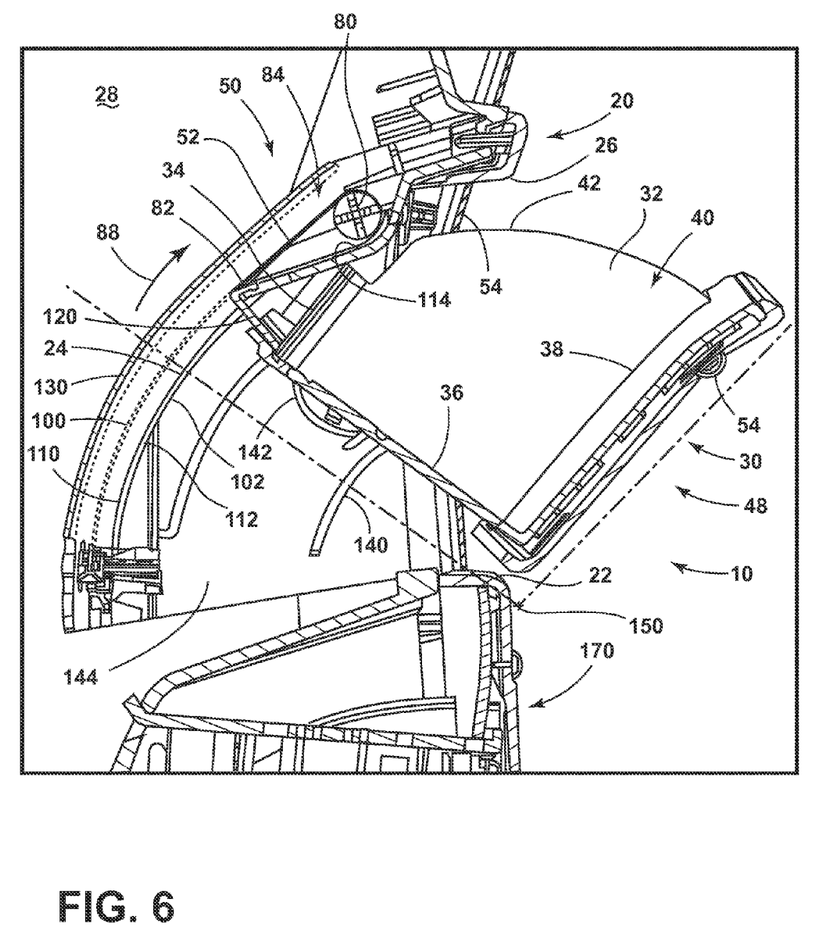
FIG. 6 is a cross-sectional view of the center console of FIG. 3, taken along line V-V and with the rotatable bin in the open position.
Figure 7:
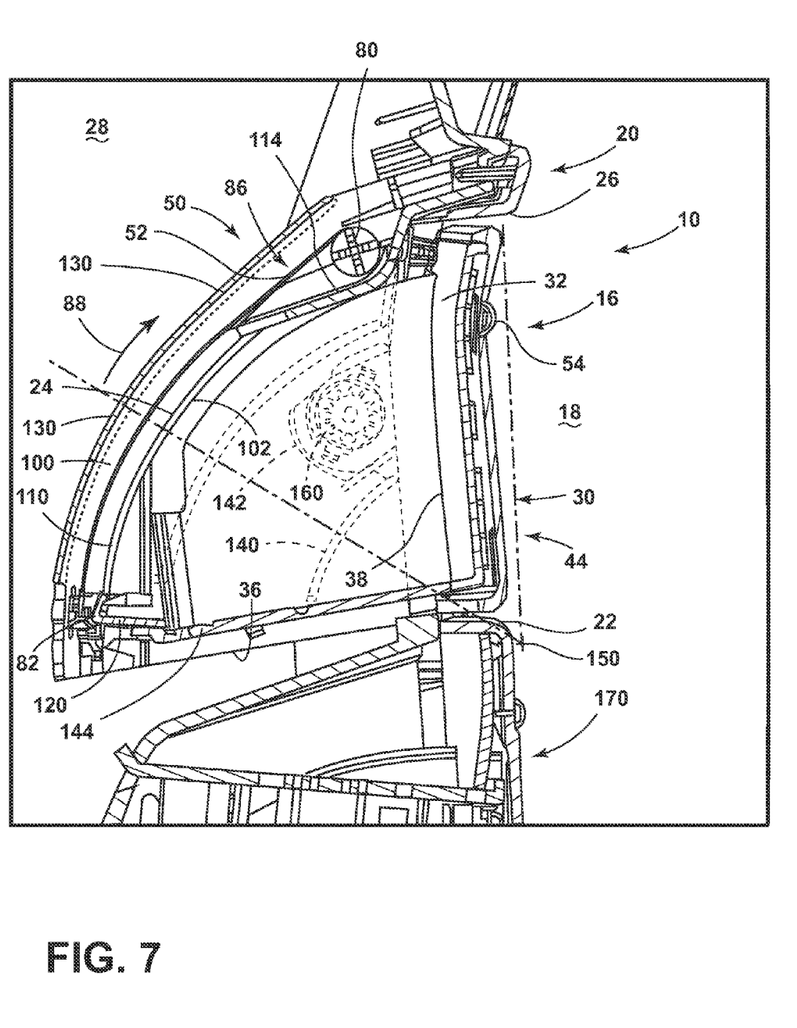
FIG. 7 is a cross-sectional view of the rotatable bin of FIG. 5 with the rotatable bin in the closed position.

Referring again to FIGS. 1-3, the console assembly 10 of the vehicle 14 is generally positioned between front row seats 56 disposed within the passenger cabin 12. In this manner, the rear portion 16 of the console assembly 10 extends at least partially into a rear area 18 of the passenger cabin 12 such that the rear portion 16 of the console assembly 10 can be accessed by occupants of the vehicle 14 sitting in the second row 58 of the passenger cabin 12. Within the rear portion 16 of this console assembly 10 is disposed various utility fixtures 70 that can include, but are not limited to, heating ventilation and air conditioning controls, electrical outlets, various bins or trays, audio visual controls, and other similar utility features. Because a large number of these features can be disposed within this rear portion 16 of the console assembly 10, space can be limited for including various features that serve utility fixtures 70 disposed within the rear portion 16 of the console assembly 10. By way of example, and not limitation, two or more bins 74 may be disposed within the rear portion 16 of the console assembly 10, such that space can be very limited for disposing certain types of biasing mechanisms 50 within one or more of the bins 74. Accordingly, a conventional torsion spring may not fit within the space provided within the rear portion 16 of the console assembly 10, without taking up usable portions of the various utility fixtures 70, such as the bins 74, in order to accommodate such a torsion spring. Additionally, a conventional torsion spring may not be feasible in certain applications as the conventional torsion spring may not allow space for the rotating guides 140 and the guide protrusion 142 (both shown in FIGS. 6-8) that are used to control the rotational movement of the rotatable bin 30. The biasing mechanism 50 of the various embodiments disclosed herein utilizing the constant force spring 52 can serve to maximize the amount of space that can be devoted toward the various utility fixtures 70. Accordingly, as will be described more fully below, the constant force spring 52 utilized in the various embodiments can be positioned above and behind the rotatable bin 30 such that space between vertically adjacent bins 74 of the rear portion 16 of the console assembly 10 can be devoted towards a larger interior volume 40 of the rotatable bin 30, rather than a servicing mechanism of any one of the utility fixtures 70.

Referring now to the embodiment illustrated in FIGS. 4-7, it is contemplated that the biasing mechanism 50 can include a constant force spring 52 that includes a spool 80 positioned at the top 26 of the arcuate back wall 24 proximate the bin aperture 22. The constant force spring 52 then extends from the spool 80 to a fixed end 82 of the constant force spring 52 that is positioned at the rear wall 34 of the rotatable bin 30. In this manner, the constant force spring 52, which tends to bias itself towards a retracted or coiled position 84 exerts a biasing force 88 against the rotatable bin 30 as the constant force spring 52 tends to pull the fixed end 82 toward the spool 80 to bias the rotatable bin 30 toward the open position 48. According to the various embodiments, it is contemplated that the fixed end 82 of the constant force spring 52 can be attached to the rotatable bin 30 at the rear wall 34, base 36, or other portion of the rotatable bin 30 that is near the arcuate back wall 24 disposed within the outer frame 20 of the console assembly 10.

Referring again to FIGS. 4-7, it is contemplated that the latch/release mechanism 54 is disposed within the outer frame 20 of the console assembly 10 proximate the bin aperture 22. In this manner, the latch/release mechanism 54 can be configured to temporarily secure the rotatable bin 30 in the closed position 44. In this manner, the latch/release mechanism 54 retains the constant force spring 52 in an uncoiled position 86, where the fixed end 82 of the constant force spring 52 is pulled away from the spool 80. Accordingly, the constant force spring 52 exerts a biasing force 88 against the rotatable bin 30 to move the rotatable bin 30 toward the open position 48. The latch/release mechanism 54 of the console assembly 10 connects at least a portion of the rotatable bin 30 to the outer frame 20 to secure the rotatable bin 30 in the closed position 44 relative to the outer frame 20.

Referring again to the embodiment illustrated in FIGS. 3-7, it is contemplated that the arcuate back wall 24 of the outer frame 20 can include a central track 100 defined within the arcuate back wall 24. According to such an embodiment, the fixed end 82 of the constant force spring 52 is configured to slidably engage the central track 100. As the rotatable bin 30 is moved between the open and closed positions 48, 44, the fixed end 82 of the constant force spring 52 is simultaneously and respectively moved between the coiled and uncoiled positions 84, 86 of the constant force spring 52. As the fixed end 82 of the constant force spring 52 moves between the coiled and uncoiled positions 84, 86, the fixed end 82 of the constant force spring 52 moves through and is guided by the central track 100 disposed within the arcuate back wall 24 of the outer frame 20.

According to the various embodiments, the central track 100 can be disposed within a bin side 102 of the arcuate back wall 24, such that the central track 100 is wholly defined within the bin side 102 of the arcuate back wall 24 and the central track 100 defines a substantially enclosed slot through which the fixed end 82 of the constant force spring 52 moves as the rotatable bin 30 moves between the open and closed positions 48, 44.

Referring again to the embodiment illustrated in FIGS. 4-7, the central track 100 can be defined within the interior side 110 of the arcuate back wall 24. In this manner, the central track 100 disposed within the interior side 110 of the arcuate back wall 24 can define a groove 112 that extends through the central track 100. Accordingly, the constant force spring 52 is disposed on the interior side 110 of the arcuate back wall 24 and positioned such that the fixed end 82 of the constant force spring 52 can move through the central track 100. The spool 80 of the constant force spring 52 can be disposed within a spool recess 114 defined within a portion of the arcuate back wall 24. The spool recess 114 is generally positioned proximate the top 26 of the bin aperture 22, such that the constant force spring 52 can pull a portion of the rotatable bin 30 upward toward the top 26 of the bin aperture 22 in order to bias the rotatable bin 30 towards the open position 48. In the open position 48, the front panel 38 of the rotatable bin 30 is disposed at an angle extending outward from the exterior surface 46 of the outer frame 20 of the console assembly 10.

Referring again to the embodiments illustrated in FIGS. 4-7, where the constant force spring 52 is disposed on the interior side 110 of the arcuate back wall 24, the fixed end 82 of the constant force spring 52 is configured to move through the central track 100, also disposed on the interior side 110 of the arcuate back wall 24. In order to attach the fixed end 82 of the constant force spring 52 to a portion of the rotatable bin 30, the fixed end 82 of the constant force spring 52 includes a sliding tab 120 that extends from the fixed end 82, through the groove 112 defined within the central track 100, and attaches to the rear wall 34 of the rotatable bin 30. In such an embodiment, the sliding tab 120 is configured to slidably move through the groove 112 as the rotatable bin 30 moves between the open and closed positions 48, 44 and the constant force spring 52 moves, respectively, between the coiled and uncoiled positions 84, 86. According to this configuration, the central track 100 and the sliding tab 120 guide the movement of the fixed end 82 of the constant force spring 52 and, in turn, guide the movement of the rotatable bin 30.

Referring again to the embodiment illustrated in FIGS. 4-7, in order to conceal the constant force spring 52, the central track 100, and other portions of the biasing mechanism 50 of the rotatable bin 30, a spring cover 130 can be disposed over the central track 100 to at least partially conceal the constant force spring 52, sliding tab 120, and other portions of the biasing mechanism 50. It is also contemplated that in embodiments where the constant force spring 52 of the biasing mechanism 50 is disposed within a central track 100 defined within a bin side 102 of the arcuate back wall 24, the spring cover 130 can also be used to conceal portions of the biasing mechanism 50 in that embodiment as well. In addition to concealing the various portions of the biasing mechanism 50, the spring cover 130 can also be used to provide additional guiding influence to the movement of the constant force spring 52 as the fixed end 82 of the constant force spring 52 moves between the coiled and uncoiled positions 84, 86. The spring cover 130 can also prevent unwanted and unnecessary interference with the biasing mechanism 50 from various items and/or debris that may come in contact with the arcuate back wall 24 of the outer frame 20.

Referring again to the embodiment illustrated in FIGS. 4-7, in order to provide for the movement of the rotatable bin 30 between the open and closed positions 48, 44, rotating guides 140 are disposed along the sides 32 of the rotatable bin 30. Arcuate rotating guides 140 are defined within sides 32 of the rotatable bin 30 that engage a guide protrusion 142 defined within interior walls 144 of the outer frame 20 that extend between the arcuate back wall 24 and the bin aperture 22. It is contemplated that the rotating guides 140 slide within or around a portion of the guide protrusion 142 and cooperate to substantially guide the rotational movement of the rotatable bin 30 as the rotatable bin 30 moves between the open and closed positions 48, 44. According to various embodiments, it is contemplated that the rotating guides 140 have a curvature that is substantially concentric with the curvature of the movement of the fixed end 82 of the constant force spring 52 as the constant force spring 52 moves between the coiled and uncoiled positions 84, 86. Accordingly, the predetermined arc circumscribed by the movement of the fixed end 82 of the constant force spring 52 as it moves between the coiled and uncoiled positions 84, 86 has substantially the same center 150 as the predetermined arcuate configuration of the rotating guides 140 disposed within the sides 32 of the rotatable bin 30. It is also contemplated that the positioning of the rotating guides 140 and the guide protrusion 142 can be switched such that the guide protrusion 142 is disposed on the sides 32 of the rotatable bin 30 and the rotating guides 140 are disposed on the interior walls 144 of the outer frame 20 extending between the bin aperture 22 and the arcuate back wall 24 of the outer frame 20.

Figure 8:
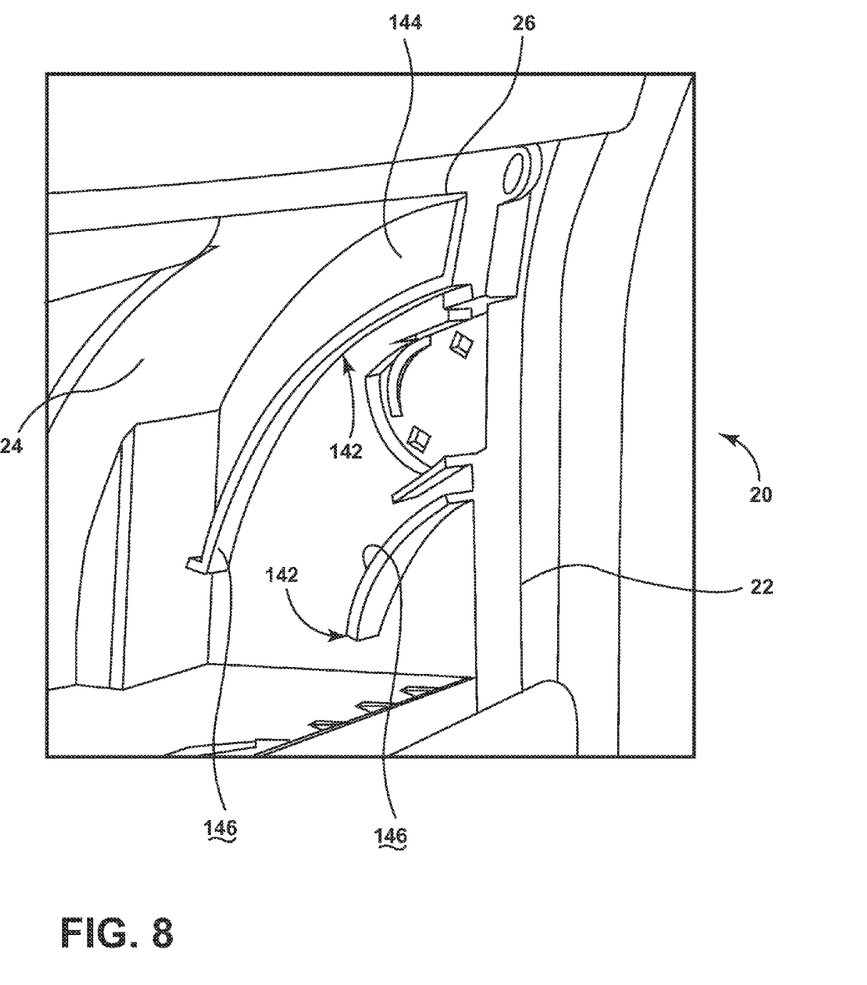
FIG. 8 is a perspective view of the console assembly looking through the bin aperture and with the rotatable bin removed.

Referring now to the embodiment illustrated in FIG. 8, the guide protrusion 142 defined within the interior walls 144 of outer frame 20 can include upper and lower guide surfaces 146 that engage and guide the rotating guides 140 as the rotatable bin 30 is moved between the open and closed positions 48, 44. In this embodiment, it is contemplated that the upper and lower guide surfaces 146 include a curvature that is concentric with the rotating guides 140, as well as the arcuate path of the fixed end 82 of the constant force spring 52.

It is contemplated that the biasing force 88 of the constant force spring 52 can be directed toward a similarly configured movement of the rotatable bin 30 as it moves between the open and closed positions 48, 44. In this manner, the biasing force 88 exerted by the constant force spring 52 can be efficiently harnessed through the cooperation of the rotating guides 140 against the guide protrusion 142 as the rotatable bin 30 operates between the open and closed positions 48, 44. In various alternate embodiments, it is contemplated that the rotatable bin 30 can include other rotational mechanisms that can include, but are not limited to, conventional hinges, interior position hinges, piano hinges, and other various hinge mechanisms.

According to various embodiments, the cooperation of the rotating guides 140 and the guide protrusion 142 to manage the movement of the rotatable bin 30 between the open and closed positions 48, 44, tends to move the rotatable bin 30 outward from the surface of the outer frame 20, instead of simply rotating the front panel 38 of the rotatable bin 30. This at least partial outward movement of the rotatable bin 30 as the rotatable bin 30 moves between the open and closed positions 48, 44 provides additional accessibility to the user as the user accesses the interior volume 40 of the rotatable bin 30.

According to the various embodiments, in order to control the speed of the movement of the rotatable bin 30 as the constant force spring 52 exerts the biasing force 88 upon the rotatable bin 30, various dampers 160 can be installed proximate a portion of the biasing mechanism 50 or the rotatable bin 30 to slow the rotation of the rotatable bin 30 between the open and closed positions 48, 44. It is contemplated that where two adjacent bins 74 within the rear portion 16 of the console assembly 10 include different mechanisms, such as the constant force spring 52 of the rotatable bin 30 and a conventional torsion spring on an adjacently positioned bin 170, various dampers 160 can be used and calibrated to match the speed of the rotatable bin 30 and the adjacently positioned bin 170 disposed within the rear portion 16 of the console assembly 10 as they move between respective open and closed positions 48, 44. Such dampers 160 can be either a one-way damper 160 that provides a movement-dampening force as the respective bin moves in one direction, but not the other. Such dampers 160 can also include a two-way damper 160 that provides a movement-dampening force as the rotatable bin 30 moves in both directions.

According to the various embodiments, the use of a constant force spring 52 can mitigate the need for the use of dampers 160 to control the movement of the rotatable bin 30 between the open and closed positions 48, 44 such that no damper 160 is included in the constant force spring 52 or in another portion of the rotatable bin 30. The constant force spring 52, which can include tape springs, conical springs, and other similar springs, provides a substantially constant biasing force 88 regardless of the distance that the fixed end 82 is from the spool 80. Typically, a constant force spring 52 is constructed as a rolled ribbon of spring steel that is configured to be relaxed when fully rolled. As the coil is unrolled, the geometry of the spring steel near the roll remains substantially constant, thereby resulting in the constant biasing force 88. Accordingly, as the rotatable bin 30 moves between the open and closed positions 48, 44 and the fixed end 82 of the constant force spring 52 moves between the respective uncoiled and coiled positions 86, 84, the biasing force 88 exerted by the constant force spring 52 remains substantially constant throughout the entire movement of the constant force spring 52 and the rotatable bin 30. This is generally unlike conventional torsion springs that provide a greater biasing power as the torsion spring is moved away from its original or idle position. Accordingly, where conventional torsion springs are used, various dampening mechanisms can be implemented in order to regulate the movement of the torsion spring into a substantially consistent speed as the torsion spring moves between its respective positions.

According to the various embodiments, it is contemplated that the constant force spring 52 is used as part of the biasing mechanism 50 to impart a substantially consistent biasing force 88 upon the rotatable bin 30. It is contemplated, in various alternate embodiments, that alternate types of springs and biasing members can be used as part of the biasing mechanism 50. Such biasing members can impart a consistent or substantially consistent biasing force 88 upon the rotatable bin 30. Additionally, as discussed above, dampers 160 can be used to alter a substantially consistent or inconsistent biasing force 88 into a consistent movement of the rotatable bin 30 as it rotates between the open and closed positions 48, 44. Such alternate biasing members can include, but are not limited to, coil springs, tension springs, reverse coil springs, elastic bands, spring steel, rotational springs, and other similar biasing members.

According to the various embodiments, the rotatable bin 30 and biasing mechanism 50 disclosed herein can be used in various portions of the vehicle 14 in addition to the rear portion 16 of the console assembly 10. Such positions can include, but are not limited to, a front portion of the console assembly 10, the dash board, side panels, ceiling, floor panels, and other various locations within the passenger cabin 12 of the vehicle 14.

According to the various embodiments, the outer frame 20 and rotatable bin 30 can be made of various rigid materials that can include, but are not limited to, metal, plastic, composite, polymers, metal alloys, combinations thereof, and other various rigid materials generally seen in vehicle interior components.

It is contemplated that the central track 100 defined within the arcuate back wall 24 of the outer frame 20 can be positioned either in a central portion of the arcuate back wall 24, or can be offset within the arcuate back wall 24. The positioning of the central track 100 within the arcuate back wall 24 can also provide space for various other utility fixtures 70 that can be integrated within the rotatable bin 30. Such additional utility fixtures 70 can include, but are not limited to, accessory electrical outlets, audio visual controls, heating ventilation and air conditioning controls, vehicle lighting, and other various utility fixtures 70. With the central track 100 disposed within only a portion of the arcuate back wall 24, there is ample room for electrical wiring and other accessory features to be run through the arcuate back wall 24 or another portion of the outer frame 20 and into a portion of the rotatable bin 30 to service the alternate utility fixtures 70 disposed therein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A console assembly for a vehicle, the console assembly comprising:
   an outer frame having a bin aperture defined therein, wherein an arcuate back wall extends from proximate the top of the bin aperture to a position within an inner volume defined by the outer frame;
   a rotatable bin disposed in the bin aperture; and
   a biasing mechanism disposed within the inner volume of the outer frame and extending from the arcuate back wall to a rear wall of the rotatable bin, wherein the biasing mechanism biases the rotatable bin from a closed position toward an open position at a constant rotational rate.

2. The console assembly of claim 1, wherein the biasing mechanism is free of the use of a damper.

3. The console assembly of claim 1, further comprising:
   a latch/release mechanism that retains the rotatable bin in the closed position and against a biasing force of the biasing mechanism.

4. The console assembly of claim 1, wherein the biasing mechanism is a constant force spring having a spool positioned at a top of the arcuate back wall and extends to a fixed end positioned at a rear wall of the rotatable bin, and wherein the constant force spring exerts a biasing force against the rotatable bin as the constant force spring tends to pull the fixed end toward the spool to bias the rotatable bin toward the open position.

5. The console assembly of claim 4, wherein the arcuate back wall of the outer frame includes a central track defined therein, wherein the fixed end of the constant force spring slidably engages the central track as the rotatable bin operates between the open and closed positions.

6. The console assembly of claim 5, wherein the central track defines a groove extending through the central track, wherein the fixed end of the constant force spring includes a sliding tab that extends from the fixed end and through the groove to attach to the rear wall of the rotatable bin, wherein the sliding tab slidably moves through the groove as the rotatable bin moves between the open and closed positions.

7. The console assembly of claim 4, wherein the spool is disposed within a spool recess defined within the arcuate back wall, and wherein a spring cover extends over and at least partially conceals the constant force spring and the spool.

8. A vehicle console assembly comprising:
   a frame defining a bin aperture;
   a rotatable bin disposed in the bin aperture; and
   a biasing mechanism extending from a position proximate the bin aperture to a rear wall of the rotatable bin, wherein the biasing mechanism is free of a damper and biases the rotatable bin from a closed position toward an open position at a constant rotational rate.

9. The vehicle console assembly of claim 8, wherein the frame includes an arcuate back wall extending from the bin aperture to a position within an inner volume defined by the outer frame, wherein the biasing mechanism is at least partially attached to the arcuate back wall.

10. The vehicle console assembly of claim 9, wherein the biasing mechanism is a constant force spring and the arcuate back wall includes a track defined therein, wherein a fixed end of the constant force spring slidably engages the track as the rotatable bin operates between the open and closed positions.

11. The vehicle console assembly of claim 10, wherein the track is defined on a bin side of the arcuate back wall, proximate an interior volume defined by the rotatable bin.

12. The vehicle console assembly of claim 10, wherein the biasing mechanism is a constant force spring having a spool positioned at a top of the arcuate back wall and extends to a fixed end positioned at a rear wall of the rotatable bin, and wherein the constant force spring exerts a biasing force against the rotatable bin as the constant force spring tends to pull the fixed end toward the spool to bias the rotatable bin toward the open position.

13. The vehicle console assembly of claim 12, wherein the frame includes guide protrusions that engage the rotatable bin and operate the rotatable bin through an arcuate path between the open and closed positions, and wherein the constant force spring and the track are disposed at a predetermined arcuate configuration that is concentric with the arcuate path of the rotatable bin defined by the guide protrusions.

14. The vehicle console assembly of claim 13, wherein the track defines a groove extending through the track, wherein the fixed end of the constant force spring includes a sliding tab that extends from the fixed end and through the groove to attach to the rear wall of the rotatable bin, wherein the sliding tab slidably moves through the groove along the predetermined arcuate configuration as the rotatable bin moves between the open and closed positions.

15. The vehicle console assembly of claim 12, wherein the spool is disposed within a spool recess defined within the arcuate back wall, and wherein a spring cover extends over and at least partially conceals the constant force spring and the spool.

16. A vehicle console assembly comprising:
   a bin rotatable within a console frame along a predetermined arc between open and closed positions; and
   a constant force spring that biases the bin toward the open position, and wherein the constant force spring operates through an arcuate path concentric with the predetermined arc, and wherein the constant force spring is free of a damper.

17. The vehicle console assembly of claim 16, further comprising:
   an arcuate back wall extending from the console frame to a position within an inner volume defined by the console frame, wherein the constant force spring is at least partially attached to the arcuate back wall; and
   a fixed end of the constant force spring that is slidably engaged with a central track defined within the arcuate back wall, wherein movement of the fixed end of the constant force spring operates the bin between the open and closed positions.

18. The vehicle console assembly of claim 17, wherein the constant force spring includes a spool positioned at a top of the arcuate back wall and extends to a fixed end positioned at a rear wall of the rotatable bin, and wherein the constant force spring exerts a biasing force against the rotatable bin as the constant force spring tends to pull the fixed end toward the spool to bias the rotatable bin toward the open position.

19. The vehicle console assembly of claim 17, wherein the console frame includes guide protrusions that engage the bin and operate the bin through an arcuate path between the open and closed positions, and wherein the constant force spring and the central track are disposed at a predetermined arcuate configuration that is concentric with the arcuate path of the bin defined by the guide protrusions.

20. The vehicle console assembly of claim 19, wherein the central track defines a groove extending through the central track, wherein the fixed end of the constant force spring includes a sliding tab that extends from the fixed end and through the groove to attach a rear wall of the bin, wherein the sliding tab slidably moves through the groove along the predetermined arcuate configuration as the bin moves between the open and closed positions.

* * * * *